March 23, 1965 W. O. BICE 3,175,203
MAGNETIC CORE DRIVING SYSTEM
Filed Aug. 20, 1962
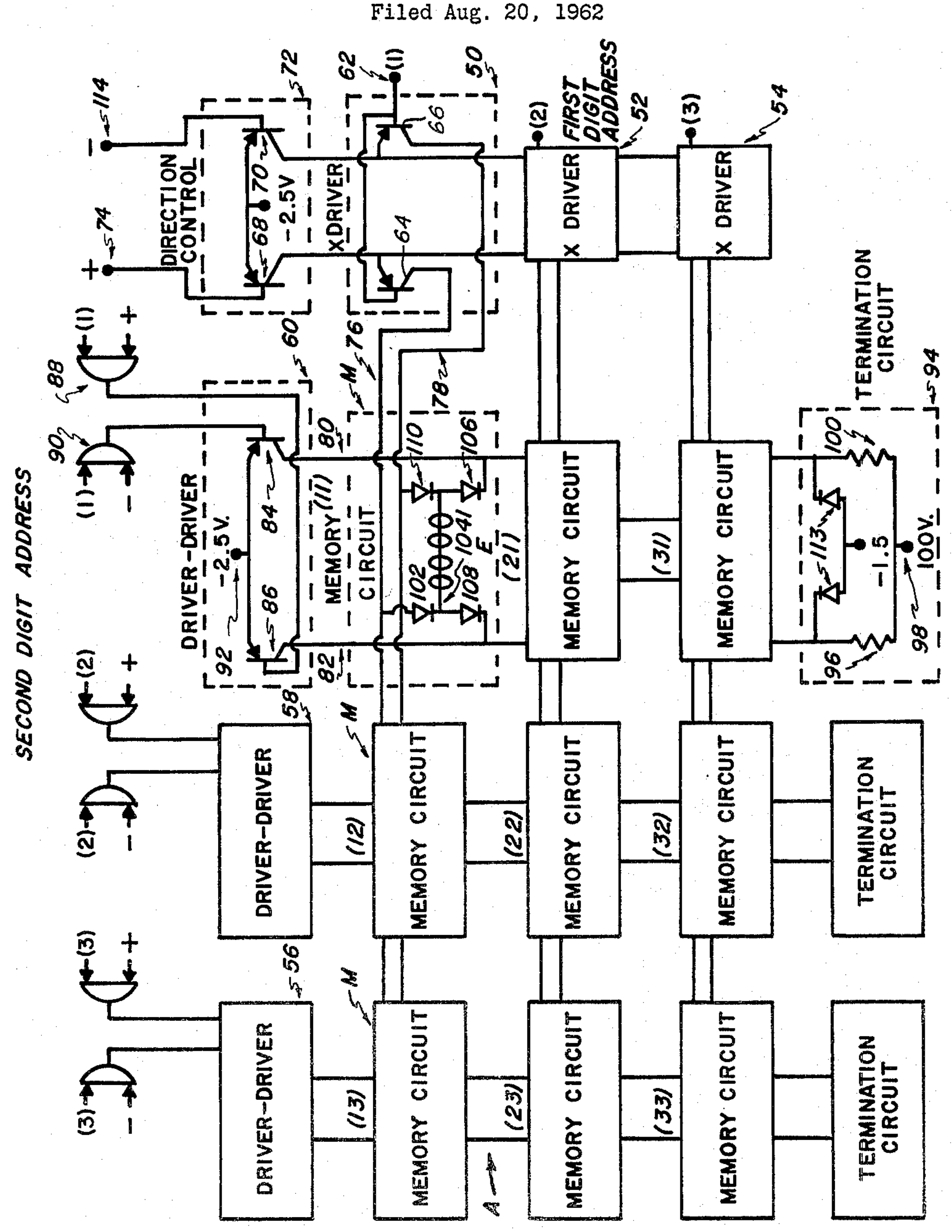
WILLIAM O. BICE
INVENTOR.
BY Byard G. Nilsson United States Patent Office 3,175,203 Patented Mar. 23, 1965

3,175,203
MAGNETIC CORE DRIVING SYSTEM

William O. Bice, Los Angeles, Calif., assignor, by mesne assignments, to Control Data Corporation, Minneapolis, Minn., a corporation of Minnesota Filed Aug. 20, 1962, Ser. No. 217,881
5 Claims. (Cl. 340—174)

The present invention relates to a system for providing magnetism to magnetic elements in a static-magnetic, coincident-current, memory system.

It has been previously proposed to employ magnetic elements which have two stable states in static-magnetic memory systems. The magnetic elements are conventionally formed of material having a generally-rectangular hysteresis loop, so that a change in state occurs only when a magnetic element is subjected to a magnetizing force above some predetermined threshold level. This criterion enables the construction of systems wherein selected elements may be driven from one magnetic state to the other without affecting the magnetic states of other elements in such system. For example, the elements may be mounted in a two-dimensional array, wherein each column and each row of magnetic elements is individually driven by a single electrical conductor. Thus, the magnetic state of a selected element is changed by passing current through the row conductor and the column conductor which link the selected element. The combined magnetic forces acting on the selected element cause the element to change from one magnetic state to the other; however, as the unselected elements are driven by a magnetizing force less than the threshold force, they are not affected and remain in the state which they were previously left.

Various arrangements have been developed for employing magnetic elements in memory systems of this type, and one such system is shown and described in the Journal of Applied Physics, volume 22, pages 44 through 48, January 1951.

In general, systems employing magnetic elements to register numerical information require an electrical circuit which provides magnetizing forces of both polarities to the magnetic elements. It is to be understood, that this circuit includes the conductors which actually provide the magnetism linking the magnetic elements. Of course, various electrical circuits of this type have been proposed; however, a need remains for a simple, fast and economical electrical system for magnetically driving selected groups of magnetic elements. In general, a continuing objective has been to reduce the number of driver circuits which actually provide the magnetic-source current, relative to the number of conductors which carry such current to the magnetic elements.

The present invention provides a driving system for a static-magnetic memory system wherein the driver circuits, i.e., current source circuits, are substantially less in number than the magnetizing conductors. This economy is accomplished by an arrangement wherein pairs of driver circuits energize a selected magnetizing conductor as a result of selective switching operations.

Various objects and advantages of the present invention will become apparent from the following detailed description when taken in conjunction with the accompanying drawings, in which;

The single figure is a diagrammatic representation of a system incorporating the present invention.

Referring to the figure, there are shown a plurality of memory circuits M arranged in a generally- rectangular array A. These memory circuits M are similar and the details in the circuits is revealed by one circuit which is shown to include a group of magnetic elements E. The elements E may take the form of toroidal structures formed of magnetic material having a substantially-rectanagular hysteresis loop. Therefore, the elements E have two stable magnetic states and are capable of registering binary information by their state. That is, if the elements E are in a positive residual state they may indicate a binary "one." However, when in a negative residual state, the elements may manifest a binary "zero."

The row of elements E shown in the figure are each driven by a similar magnetizing force by the system shown. Therefore, these elements may comprise one row or column in a two-dimensional array of magnetic elements forming a coincident-current memory, or, the elements may comprise several rows or columns in a three-dimensional from of such a system.

The elements in each of the memory circuits M are connected to be driven by a pair of driver circuits which includes one X driver (shown in vertical alignment) and one driver-driver (shown in horizontal alignment). These circuits are selectively energized to energize a particular memory circuit and thereby apply a magnetizing force to a selected group of magnetic elements which is insufficient to affect a change in state by these elements, but which is sufficiently strong to be a factor in affecting such a change of state. It is to be noted in considering the described embodiment of the invention that nine memory circuits M are driven whereas only seven driver circuits are provided. Of course, the extension of the number of memory circuits M to the number provided in a practical memory system would increase this economy to a considerable extent.

In coincident-current magnetic memory systems, the electrical current which provides magnetic driving force to rows of elements has been conventionally termed the "X" current, whereas the current for driving the columns has been termed the "Y" current. In the illustrated system of the present invention, structure for supplying only the "X" current is shown. Of course, this system could be integrated with a similar system to form a complete and operating memory unit as well known in the prior art.

In the operation of a coincident-current memory system the various rows and columns are conventionally addressed by a memory address code. In the system shown in the figure the various memory circuits, each of which include a plurality of magnetic elements M comprising one or several rows, are addressed by the numerical values shown in parentheses. Specifically, a two-digit code is employed to address the various memory circuits. The first digit may take the form of numerals 1, 2 or 3 and selects one of the X driver circuits 50, 52, or 54. That is, each of these driver circuits receive a two-state signal representative respectively of the digits 1, 2 and 3, and which becomes true to manifest the presence of that digit. The second digit of the address indicates the driver-driver circuit 56, 58, or 60, which is to be energized to cooperate with the selected X driver.

Each of the circuits 50, 52, 54, 56, 58 and 60 provide two output conductors. The conductor energized from the selected circuit depends upon the polarity of the magnetization to be applied to the elements E. Of course, this consideration is determined by the general philosophy of various memory systems; however, in certain system, the polarity is determined by whether a reading or a registering operation is to take place. However, in any event, the address code includes a signal to indicate the polarity of the magnetizing force to be applied. In the system shown, the appearance of a high value for a two-state signal indicated by a plus symbol + indicates that the elements are to be driven toward positive polarity; whereas, the high state for a minus symbol —, indicates that the elements are to be driven with a magnetic force of negative polarity.

In accordance with this philosophy of organization, the following chart sets forth the operations accomplished by the possible address codes applicable to the system.

| Address | Operation |
|---|---|
| 11+ | Drive elements (11) positively. |
| 12+ | Drive elements (12) positively. |
| 13+ | Drive elements (13) positively. |
| 21+ | Drive elements (21) positively. |
| 22+ | Drive elements (22) positively. |
| 23+ | Drive elements (23) positively. |
| 31+ | Drive elements (31) positively. |
| 32+ | Drive elements (32) positively. |
| 33+ | Drive elements (33) positively. |
| 11− | Drive elements (11) negatively. |
| 12− | Drive elements (12) negatively. |
| 13− | Drive elements (13) negatively. |
| 21− | Drive elements (21) negatively. |
| 22− | Drive elements (22) negatively. |
| 23− | Drive elements (23) negatively. |
| 31− | Drive elements (31) negatively. |
| 32− | Drive elements (32) negatively. |
| 33− | Drive elements (33) negatively. |

The operation of the system shown in the figure which is illustrative of the present invention may now best be described by assuming certain conditions and introducing the elements of the system along with the description of their operation upon such assumed conditions.

Initially, assume that it is desired to drive the elements E in the memory circuit M (11) with a magnetism of positive polarity. In considering the above chart, it is apparent that the address code to accomplish this objective is 11+. The first of the address code "1" being true causes the terminal 62 to be driven to a voltage level which renders the control base electrodes of transistors 64 and 66 at a potential to provide a closed circuit between the emitter and collector electrodes of these transistors. The emitter electrodes of the transistors 64 and 66 are connected respectively to the collector electrodes of transistors 68 and 70 in the direction-control circuit 72. The emitter electrodes of the transistors 68 and 70 are connected to a source of reference potential and the base electrodes of these transistors are connected to receive the signals indicative of the polarity of the driving magnetism. In the instant case, it has been assumed that the magnetic elements are to be driven in a positive direction; and therefore, the terminal 74 receives a signal to turn the transistor 68 on permitting current to flow from the reference voltage level through the transistor 68, and the transistor 64 (in the X driver 59) to an horizontal conductor 76. Another horizontal conductor 78 also emerges from the driver 59; however, that conductor is connected to the collector electrode of the transistor 66, the emitter of which is connected to the transistor 70 that is now in an "off" state. Therefore, conductor 78 is isolated and only the conductor 76 is adapted to be energized.

Although the conductors 76 and 78 are referred to as horizontal conductors, it is to be understood that this term of reference serves only to identify these conductors and has no particular reference to their physical orientation.

From the above consideration, it may be seen that the horizontal conductor 76 is essentially connected to a source of reference potential. However, in order to apply a magnetizing force to the elements E, it is also necessary to connect one of the vertical conductors 80 or 82 exclusively to a source of different potential.

The conductors 80 and 82 are connected respectively to the collector electrodes of transistors 84 and 86 which comprise the driver-driver circuit 60. The control base electrodes of the transistors 84, 86 are connected respectively to "and" gates 88 and 90, which pass a signal during the quiescent state by receiving a pair of true input signals. Therefore, the transistors 84 and 86 are normally conductive. However, upon the occurrence of a +1 address component, the gate 90 is cut off, thereby rendering the transistor 84 cut off. In this regard, it is to be noted that during the driving operation the gate 88 is qualified by the address 11+; however, this situation is accomplished by turning off the gate 90 which along with all the similar gates are normally qualified by a pair of high input signals, but which are disqualified during an energizing or driving operation.

As it has been assumed the elements E are to be driven with positive polarity; the inputs to the gate 88 remain true, qualifying the gate and causing it to maintain the transistor 86 conductive thereby connecting the vertical conductor 82 to terminal 92 which is connected to a source of low negative potential. As a result of this connection, current flows from the terminal 92 through the transistor 86, the memory circuit M and into a termination circuit 94 which includes a resistor 96 that receives the subject current and is connected to a terminal 98 adapted to be connected to a source of relatively high negative potential. As a result of this established current path, the vertical conductor 82 approaches a voltage of the terminal 92 which substantially coincides to the voltage in the horizontal conductor 76. It may therefore be seen, that no potential differential exists between these two conductors. However, during this interval, the transistor 84 is cut off so that the vertical conductor 80 which is connected to the termination circuit 94 is connected to the source of high negative potential at the terminal 98 through a resistor 100. Therefore, the conductor 80 is highly negative relative to the conductor 76. Therefore, a current may flow from the conductor 76 through a diode 102, and energizing conductor 104, and a diode 106, to reach the conductor 80. It is to be noted, that no current passes through adjacent diodes 108 and 110 in this instance because both of these diodes are reverse biased.

Thus a substantial current is drawn through this path and the current-limiting resistor 100 to apply a magnetizing force of positive polarity to the elements E. It is to be noted, in this regard, that a pair of diodes 113 in the termination circuit 94 serve to clamp the vertical conductors 80 and 82 below a reference potential level.

Pursuing another example of operation of the system shown, assume it is desired to drive the elements E with a negative polarity magnetism. In this instance, the signal at the terminal 62 is again true thereby turning the transistors 64 and 66 on; however, the transistor 70 is now turned on as a result of a true signal at the terminal 114. Therefore, current is permitted to flow from the source of reference potential through the transistor 70, the transistor 66, and into the horizontal conductor 78. During this time, the gate circuit 90 remains qualified (as a result of the continuing input signals) to maintain the transistor 84 conductive. However, the gate 88 is now disqualified to cut off the transistor 86. Therefore, the vertical conductor 80 drops to a reference level of potential while the vertical conductor 82 assumes a relatively high negative potential. As a result, current may flow from the conductor 78 through the diode 110, the magnetizing conductor 104, and the diode 108 to drive the magnetic elements in a negative polarity.

It is to be understood, that the modes of operation described above apply similarly to each of the memory circuits, the termination circuits, the gate circuits, and the driver circuits otherwise shown in the system. In this manner, the magnetic elements in any of the memory circuits may be selected and driven with a magnetic force of either polarity. Furthermore, the number of elements E may vary widely and be driven by one or several systems of the present invention to obtain an operative memory unit as well known in the art.

As a result of the above considerations, it is apparent that a major feature of the present invention is a reduction in the requisite number of driver circuits for any given number of magnetizing conductors provided in a system.

These and other features of the present invention are evident from the embodiments described herein; however, the scope of the invention is not to be limited to these embodiments, but rather is to be defined by the following claims.

What is claimed is:

1. A system for selectively driving one of a plurality of groups of magnetic elements with magnetizing force of either polarity, comprising: a plurality of magnetizing conductors coinciding in number to said plurality of groups of elements, said magnetizing conductors for providing magnetism to each of said groups of elements; a plurality of pairs of horizontal conductors; plural groups of first unilateral conducting devices, each such group being connected between one conductor in each of said pairs of horizontal conductors and first ends of said magnetizing conductors; plural groups of second unilateral conducting devices, each such group being connected between another conductor in each of said pairs of horizontal conductors and other ends of said magnetizing conductors; a plurality of pairs of vertical conductors; plural groups of third unilateral conducting devices, each such group being connected between one conductor in each pair of vertical conductors and said first ends of said magnetizing conductors; plural groups of fourth unilateral conducting devices, each such group being connected between a second conductor in each pair of vertical conductors and said other ends of said magnetizing conductors; means for selectively energizing one of said conductors in said horizontal pairs with electrical current during certain intervals; and means for selectively connecting one conductor of said vertical pairs of conductors to a source of reference potential whereby a selected group of magnetic elements may be driven in each polarity.

2. Apparatus according to claim 1 wherein said means for selectively energizing one of said conductors in said horizontal pairs comprises a direction control circuit including a first drive conductor energized with an electrical current for one polarity and a second drive conductor energized with an electrical current for another polarity; and a plurality of driver circuits connected to said pairs of horizontal conductors and said first and second conductors and adapted to receive a control signal to connect one of said pairs of horizontal conductors to one of said drive conductors.

3. Apparatus according to claim 2 wherein said driver circuits include a pair of transistor switches.

4. Apparatus according to claim 2 wherein said direction control circuit includes a pair of transistor switches.

5. Apparatus according to claim 1 wherein said means for selectively connecting one conductor of said vertical pairs to a source of reference potential comprises: plural pairs of transistor switches for controlling the potential level of said vertical pairs, and plural gate circuits for selectively controlling said transistor switches in accordance with the group of elements to be driven and the polarity of magnetism.

No references cited.